(12) United States Patent
Jung et al.

(10) Patent No.: US 10,819,834 B2
(45) Date of Patent: Oct. 27, 2020

(54) ELECTRONIC DEVICE

(71) Applicant: LG ELECTRONICS INC., Seoul (KR)

(72) Inventors: Byungwoon Jung, Seoul (KR); Soyeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/623,190

(22) PCT Filed: Jul. 4, 2017

(86) PCT No.: PCT/KR2017/007089
§ 371 (c)(1),
(2) Date: Dec. 16, 2019

(87) PCT Pub. No.: WO2019/009441
PCT Pub. Date: Jan. 10, 2019

(65) Prior Publication Data
US 2020/0162591 A1     May 21, 2020

(51) Int. Cl.
*H04M 1/02* (2006.01)
*H01Q 5/371* (2015.01)
(Continued)

(52) U.S. Cl.
CPC .............. *H04M 1/02* (2013.01); *H01Q 1/243* (2013.01); *H01Q 1/38* (2013.01); *H01Q 5/371* (2015.01)

(58) Field of Classification Search
CPC ......... H04M 1/02; H01Q 5/371; H01Q 1/243; H01Q 1/38; H01Q 1/24
See application file for complete search history.

(56) References Cited

U.S. PATENT DOCUMENTS

| 8,723,740 B2 * | 5/2014 | Chiu | H01Q 1/243 343/702 |
| 10,608,325 B2 * | 3/2020 | Hashizume | H01Q 1/243 |

(Continued)

FOREIGN PATENT DOCUMENTS

| CN | 104852122 A | 8/2015 |
| CN | 106030902 A | 10/2016 |

(Continued)

*Primary Examiner* — Lewis G West
(74) *Attorney, Agent, or Firm* — Birch, Stewart, Kolasch & Birch, LLP

(57) ABSTRACT

An electronic device of the present disclosure comprises: a housing including a metal frame; and a first antenna unit which is arranged at one side of the housing and transmits and receives a signal at a specific frequency band, wherein: the first antenna unit includes a first metal member which is connected to the metal frame, receives power by a power feeding unit, and has a length set to be radiated at the specific frequency band, and a second metal member which is arranged at a spaced gap of a preset interval from the first metal member and has one end coming into contact with the metal frame; a current, which is induced through the second metal member coupled with the first metal member, moves to the metal frame by means of the spaced gap; the first metal member, the second metal member and the metal frame are arranged to be separated from one another; and the first and second metal members are formed to resonate at the specific frequency band.

20 Claims, 12 Drawing Sheets

(51) Int. Cl.
   *H01Q 1/24*   (2006.01)
   *H01Q 1/38*   (2006.01)

(56) References Cited

U.S. PATENT DOCUMENTS

| | | | | |
|---|---|---|---|---|
| 2011/0273342 | A1* | 11/2011 | Park | H01Q 1/243 |
| | | | | 343/702 |
| 2015/0200445 | A1* | 7/2015 | Murphy | H01Q 23/00 |
| | | | | 343/702 |
| 2015/0295599 | A1* | 10/2015 | Fujiwara | H01P 7/084 |
| | | | | 455/41.1 |
| 2016/0142866 | A1* | 5/2016 | Jang | H01Q 7/00 |
| | | | | 455/41.1 |
| 2017/0142241 | A1* | 5/2017 | Kim | H01Q 9/30 |
| 2018/0331416 | A1* | 11/2018 | Yu | H04B 5/0025 |
| 2019/0081387 | A1* | 3/2019 | Pandya | H04M 1/0266 |
| 2019/0222683 | A1* | 7/2019 | Choi | H01Q 1/243 |
| 2019/0252766 | A1* | 8/2019 | Jeon | H01Q 3/26 |

FOREIGN PATENT DOCUMENTS

| | | |
|---|---|---|
| KR | 10-2012-0133368 A | 12/2012 |
| KR | 10-2012-0137422 A | 12/2012 |
| KR | 10-1619322 B1 | 5/2016 |
| KR | 10-2016-0089339 A | 7/2016 |
| KR | 10-2016-0146138 A | 12/2016 |
| KR | 10-2017-0073964 A | 6/2017 |

* cited by examiner

ELECTRONIC DEVICE

CROSS-REFERENCE TO RELATED APPLICATIONS

This application is the National Phase of PCT International Application No. PCT/KR2017/007089 filed on Jul. 4, 2017, the entirety of which is hereby expressly incorporated by reference into the present application.

TECHNICAL FIELD

The present disclosure relates to an electronic device having antennas arranged on the right and left sides.

BACKGROUND ART

Electronic devices may be divided into mobile/portable terminals and stationary terminals according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

Recently, research to minimize a bezel region which encloses a display unit of an electronic device in order to maximize an arrangement region of the display unit is actively ongoing. Further, as the electronic device becomes multifunctional, the number of antennas is increased. Thus, an internal space where antennas are to be arranged at upper and lower ends of the conventional display unit is reduced. This may cause a difficulty in obtaining an arrangement position of antennas.

Further, as the bezel region is reduced, it is difficult to obtain a gap between an antenna portion and a ground portion. In case of a low band (LB) antenna, a ground length obtained when the antenna is arranged at any position of a housing of an electronic device is short. This may lower antenna efficiency.

DISCLOSURE

Technical Problem

The present disclosure is to enhance efficiency by arranging antennas included in an electronic device on the right and left sides of a housing.

Technical Solution

According to an aspect of the present disclosure, to achieve the above or other purpose, an electronic device according to an embodiment of the present disclosure comprises: a housing having a metal frame; and a first antenna unit configured to transmit/receive signals at a specific frequency band arranged on one side surface of the housing, wherein the first antenna unit includes: a first metal member connected to the metal frame, and having a preset length so as to radiate at the specific frequency band by receiving a power from a feeding portion; and a second metal member arranged to form a gap of a preset interval with the first metal member, and having one end contacting the metal frame, wherein a current induced through the second metal member coupled with the first metal member by the gap, is moved to the metal frame, wherein the first and the second metal members are spaced apart from the metal frame, and wherein the first and second metal members resonate at the specific frequency band. Since the ground region on the metal frame is expanded by the second metal member, antenna efficiency may be enhanced. This may allow the antenna units to be arranged even on a narrow bezel space on the side surface of the housing.

In an embodiment, the first and second metal members may be integrally formed with the metal frame, or may be implemented by a metal case which forms the appearance.

In an embodiment, the low band antenna unit may further include a capacitor connected to at least one of the first and second metal members. This may enhance antenna efficiency, and may reduce the length of the first and second metal members.

Advantageous Effect

In the present disclosure, since the ground region is expanded by the second metal member, the antenna units may be arranged on the right and left side surfaces of the housing, without lowering antenna performance. Thus, even an electronic device having a narrow bezel region may be provided with a plurality of antenna units.

Further, since the metal members have a minimized length by including patterns or capacitors, a space occupied by the antenna units may be minimized.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
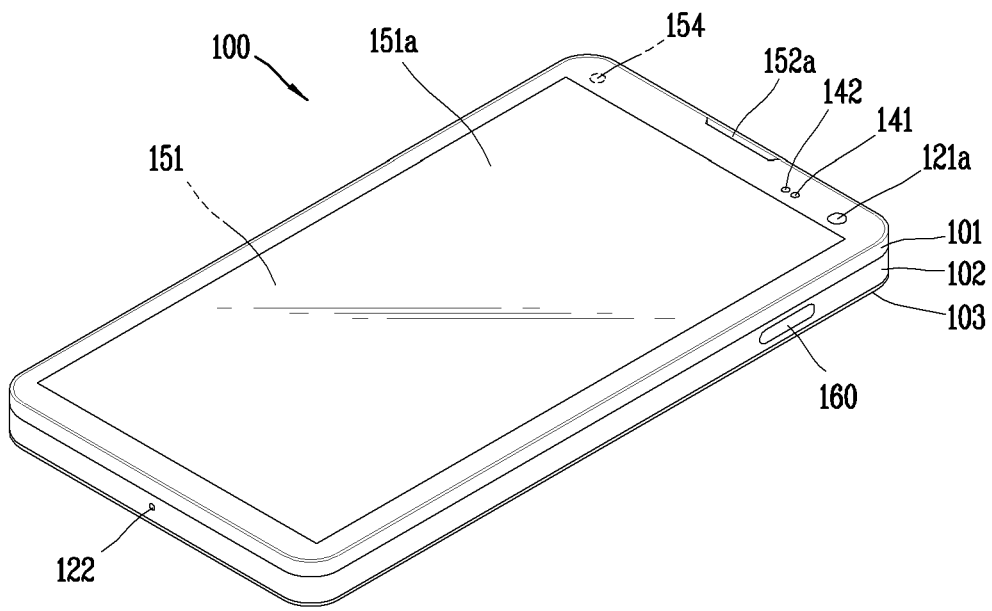
FIGS. 1A and 1B are views of an electronic device according to an embodiment of the present disclosure, which are seen from different directions.
Figure 1B:
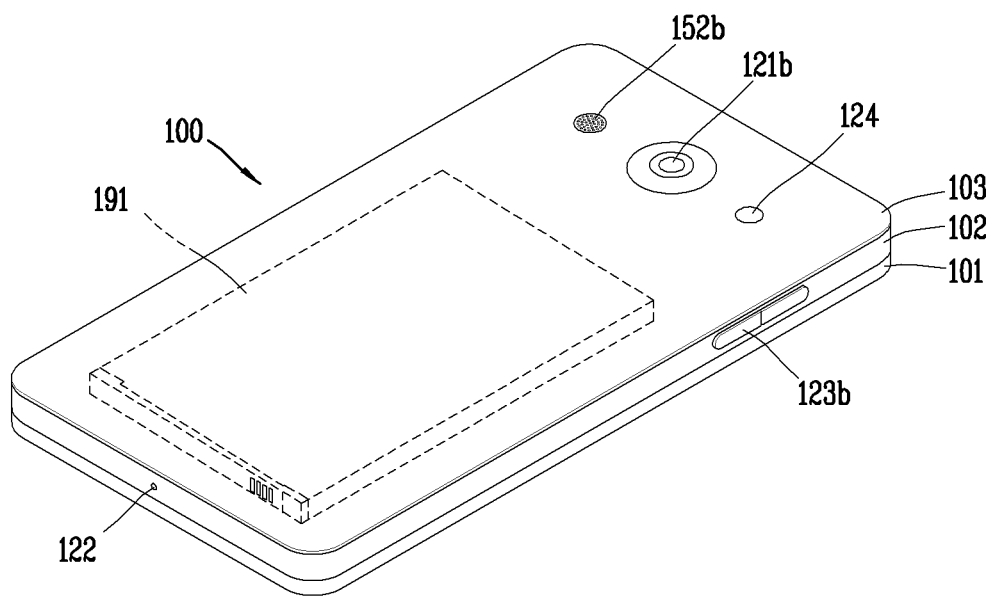

FIGS. 1A and 1B are views of a mobile terminal according to one embodiment of the present disclosure, viewed from different directions.

Referring to FIGS. 1A and 1B, the mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Description herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 300 is detached from the rear case 102, the electronic components mounted on the rear case 102 are exposed to the outside.

As illustrated, when the rear cover 300 is coupled to the rear case 102, a side surface of the rear case 102 may partially be exposed. In some cases, upon the coupling, the rear case 102 may also be completely shielded by the rear cover 300. Meanwhile, the rear cover 300 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 300, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1A and 1B, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as a user input unit. In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Meanwhile, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 300 or a case including a metallic material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 300 is coupled to the rear case 102 for shielding the battery 191, so as to prevent separation of the battery 191 and protect the battery 191 from an external impact or foreign materials. When the battery 191 is detachable from the terminal body, the rear case 300 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2A:
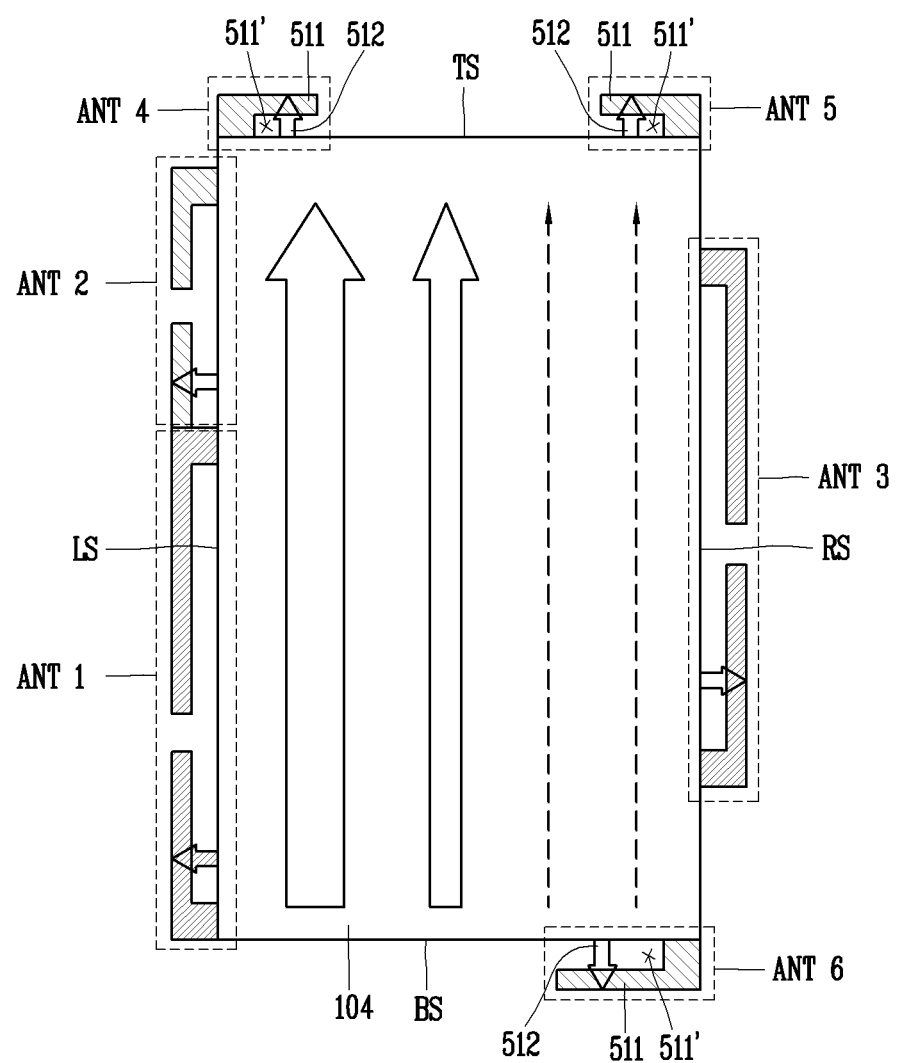
FIG. 2A is a conceptual view for explaining an arrangement structure of a wireless communication unit included in an electronic device according to an embodiment of the present disclosure.
Figure 2B:
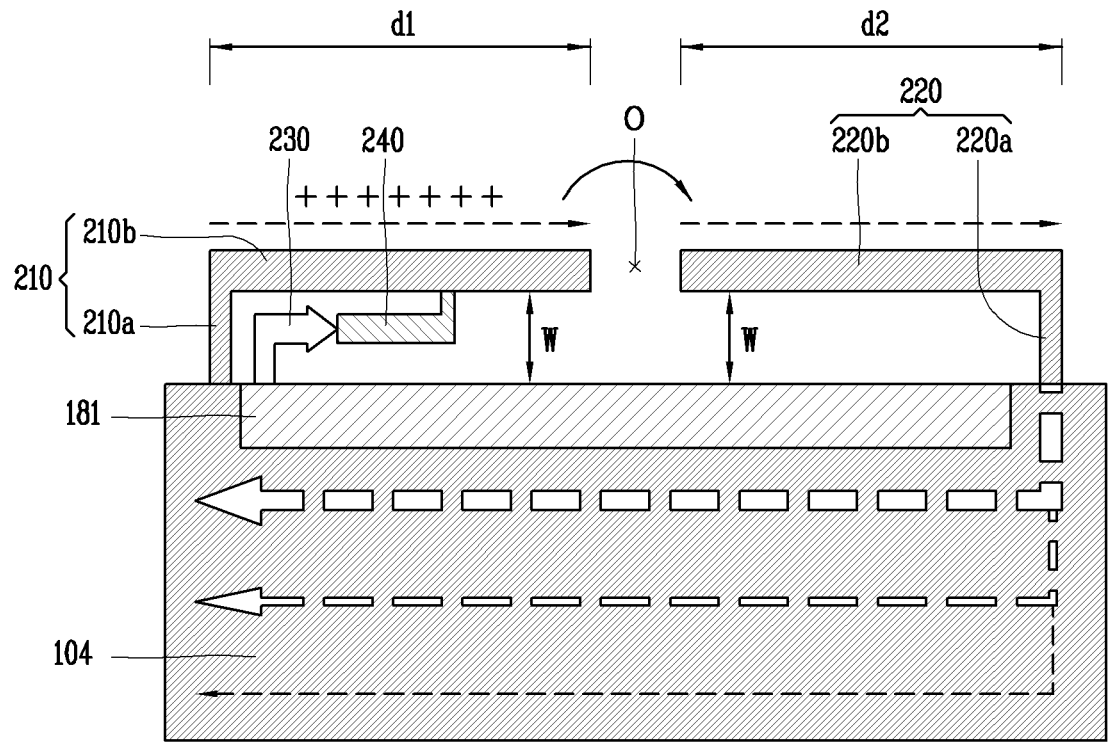
FIG. 2B is a conceptual view for explaining components of antenna units arranged on the right and left sides of the electronic device.

FIG. 2A is a conceptual view for explaining an arrangement structure of a wireless communication unit included in an electronic device according to an embodiment of the present disclosure, and FIG. 2B is a conceptual view for explaining components of antenna units arranged on the right and left sides of the electronic device.

FIG. 2A shows a plurality of antenna units electrically connected to a metal frame 104. The metal frame 104 may be formed to have four surfaces, a top surface (TS), a bottom surface (BT), a left side surface (LS) and a right side surface (RS), on the basis of the display unit 151 of FIG. 1A. For instance, first and second antennas (Ant1, Ant2) are arranged near the left side surface (LS), and third antenna (Ant 3) is arranged near the right side surface (RS). And fourth and fifth antennas (Ant4, Ant5) are arranged near the top surface (TS), and sixth antenna (Ant6) is arranged near the bottom surface (BS).

Each of the fourth to sixth antennas (Ant4, Ant5, Ant6) includes a metal member 511 having one end connected to the metal frame 104 and having a bent shape, and a feeding portion 512 connected to the metal member 511. A space is formed between the metal member 511 and the metal frame 104.

For instance, the fourth antenna (Ant4) receives a GPS signal, and the fifth antenna (Ant5) receives a Wi-Fi signal. The metal member 511 of each of the fourth to sixth antennas (Ant4, Ant5, Ant6) may be formed to have a different length, and may be configured as a mid-band (MB) antenna or a high band (HB) antenna.

At least one region of the metal frame 104 is configured as a ground, and is grounded through a region contacting the metal member 511. For instance, in case of the fourth antenna (Ant4), a current may flow towards the bottom surface (BS) of the metal frame 104. The fourth to sixth antennas (Ant4, Ant5, Ant6) form a ground region relatively wide in upper and lower directions of the metal frame 104.

The first and second antennas (Ant1, Ant2) are arranged on the left side surface (LS), and the third antenna (Atn3) is arranged on the right side surface (RS). The first to third antennas (Ant1, Ant2, Ant3) are configured as low band (LB) antennas. Radiation members of the low band (LB) antennas may be formed to have a longer electric (or physical) length than those of the fourth to sixth antennas (Ant4, Ant5, Ant6).

Referring to FIG. 2B, components of the first to third antennas (Ant1, Ant2, Ant3) will be explained.

Referring to FIG. 2B, an antenna unit of each of the first to third antennas (Ant1, Ant2, Ant3) includes a first metal member 210, a second metal member 220, a feeding portion 230, and a connection portion 240.

The first metal member 210 includes a first region 210a extended from the metal frame 104; and a second region 210b extended from the first region 210a in a bent manner, and forming an opening having a size of a specific gap (w) with the metal frame 104. The first metal member 210 is formed to have a first length (d1).

An extension portion 240 formed of a metallic material is extended from the second region 210b, and the extension portion 240 is connected to the feeding portion 230. The feeding portion 230 is extended from the printed circuit board 181 to supply a power to the first metal member 210.

The second metal member 220 is arranged near the first metal member 210 so as to have a gap (o). The second metal member 220 includes a first region 220a extended from the metal frame 104; and a second region 220b extended from the first region 220a in a bent manner, and spaced apart from the metal frame 104 by a specific gap (w). The second metal member 220 is formed to have a second length (d2). Here, the first and second lengths (d1, d2) may be formed to be equal to each other.

The sum of the lengths of the first and second metal members 210, 220 may be λ/2 of a low band (LB). That is, each of the first and second lengths (d1, d2) is λ/4 of a low band (LB). Resonance of the first metal member 210 is not significantly changed by the second metal member 220, and radiation efficiency is increased.

A coupling amount may be controlled according to an interval of the gap (o). If the antenna unit is radiated at a low band (LB), antenna efficiency is increased when the gap (o) is small.

The second length (d2) of the second metal member 220 is formed so that an electric length of the second metal member 220 and an electric length of a frequency of the antenna unit are λ/4.

A gap (o) is formed between the second region 210b of the first metal member 210 and the second region 220b of the second metal member 220, thereby insulating the first and second metal members 210, 220 from each other. The gap (o) is formed to have a preset specific distance.

The first and second metal members 210, 220 are integrally formed with the metal frame 104. That is, the metal frame may be formed to have the space of the specific gap (w) and to have the gap (o).

If feeding is performed by the feeding portion 230 in a state that one end of the first metal member 210 (the first region 210a) is short-circuited to the metal frame 104, the first and second metal members 210, 220 are coupled to each other. As the first and second metal members 210, 220 are coupled to each other, an induced current is introduced into the metal frame 104 through the second metal member 220. That is, a region of the metal frame 104, which is utilized to a ground, is expanded by the second metal member 220.

That is, the first metal member 210 is configured as a radiator of an antenna unit, which radiates to a specific frequency band. And the second metal member 220 is configured as a ground booster for expanding a ground region formed at the metal frame 104.

In this embodiment, since a ground region can be expanded by a ground booster, an antenna unit which radiates to a low band (LB) frequency band may be arranged on the right and left side surfaces of the metal frame 104.

Accordingly, a bezel region formed at upper and lower ends of a housing may be minimized, and various types of antennas may be arranged near the metal frame.

Figure 3:
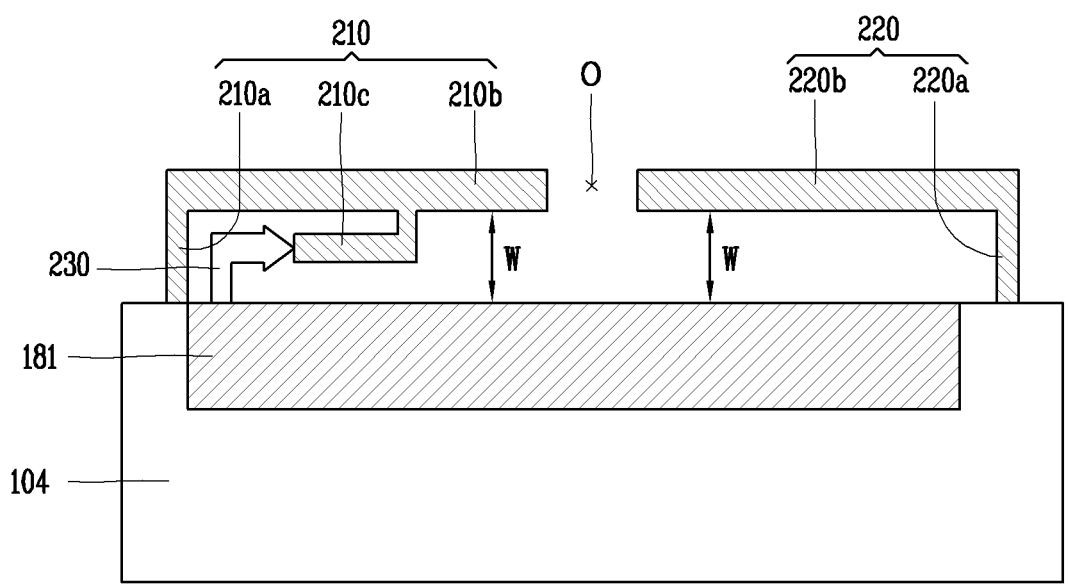
FIG. 3 is a conceptual view for explaining an antenna unit including an additional metal member connected to a metal frame.

FIG. 3 is a conceptual view for explaining an antenna unit including an additional metal member connected to the metal frame.

Referring to FIG. 3, the first and second metal members 210, 220 are formed as separate members from the metal frame 104. The first metal member 210 includes a first region 210a having one end connected to the metal frame 104; a second region 210b extended from the first region 210a in a bent manner, and forming a gap (w) with the edge of the metal frame 104; and a third region 210c extended from the second region 210b. The third region 210c is arranged between the second region 210b and the metal frame 104, and is electrically connected to the feeding portion 230.

The second metal member 220 includes a first region 220a connected to the metal frame 104, and a second region 220b extended from the first region 220a.

The first and second metal members 210, 220 are fixed to the metal frame 104 so that a gap (o) is formed between the second regions 210b, 220b. Accordingly, the metal members are not formed by cutting the metal frame 104. This may simplify the fabrication processes, and may easily transform the shape of the metal members.

Figure 4A:
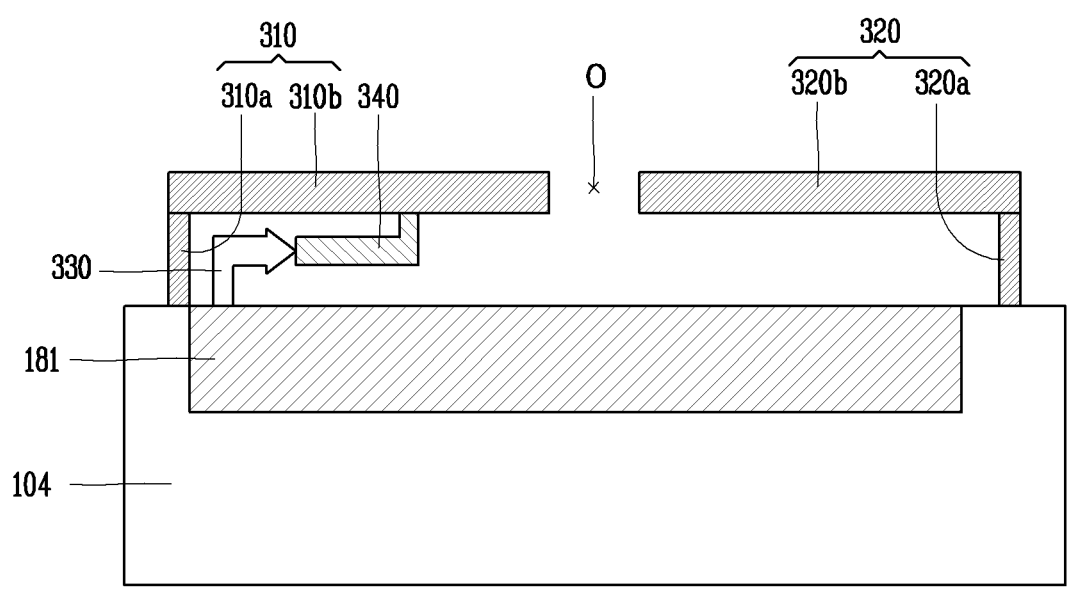
FIGS. 4A and 4B are conceptual views for explaining an embodiment where a metal member is formed at one region of a metal case.
Figure 4B:
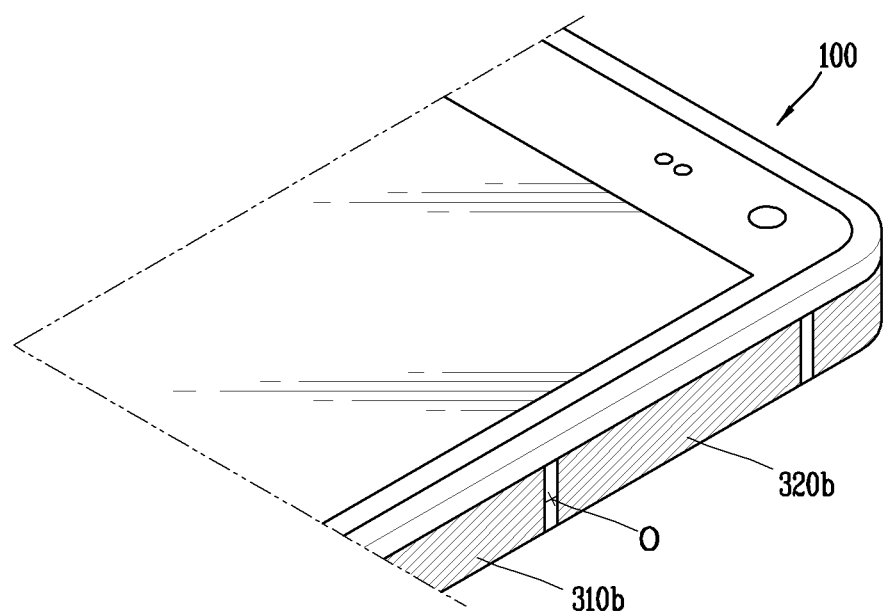

FIGS. 4A and 4B are conceptual views for explaining an embodiment where metal members are formed at one region of the metal case.

Referring to FIGS. 4A and 4B, one region of first and second metal members 310, 320 connected to the metal frame 104 may be a specific region of a metal case which forms the side surfaces of the electronic device 100.

The metal case includes a gap (o) between the first and second metal members 310, 320, and a filling material of an insulating property may be applied to the gap (o). The first and second metal members 310, 320 include first region 310a, 320a connected to the metal frame 104, and second regions 310b, 320b configured as specific regions of the metal case.

The first regions 310a, 320a and the second regions 310b, 320b may be formed as separate members to thus be connected to each other, or may be integrally formed with each other. A connection portion 340 is extended from one region of the first metal member 310, and is electrically connected to the feeding portion 330.

In this embodiment, a radiator of an antenna unit and a ground booster for expanding a ground may be implemented by using the metal case forming the appearance.

FIGS. 5A to 5D are conceptual views for explaining an antenna unit according to various embodiments.

Figure 5A:
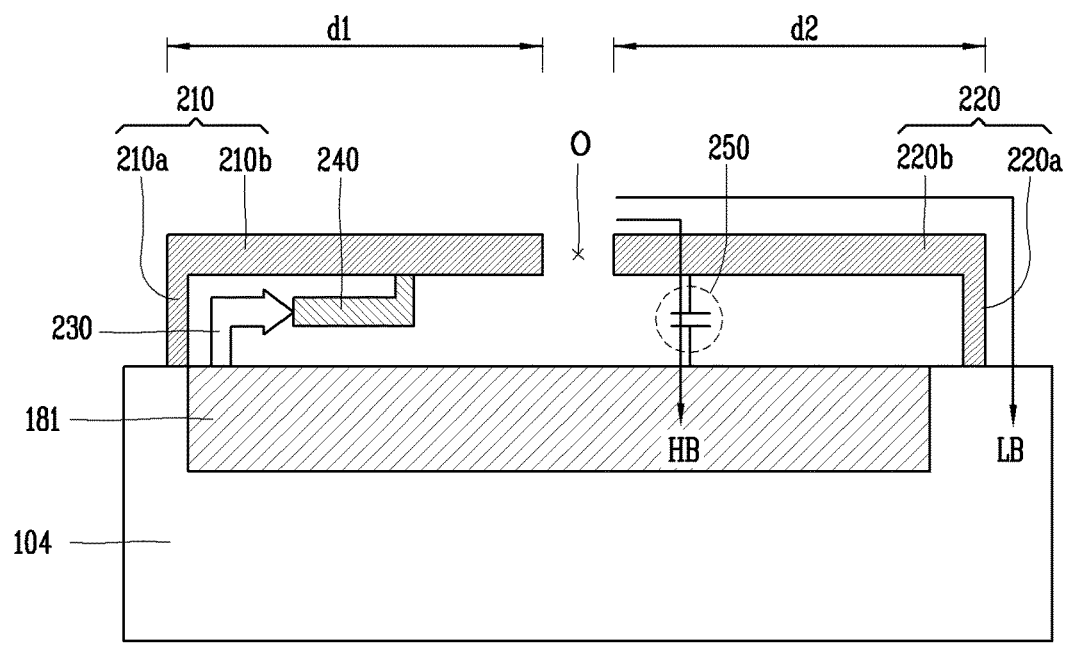
FIGS. 5A to 5D are conceptual views for explaining an antenna unit according to various embodiments.

Referring to FIG. 5A, an antenna unit includes the first and second metal members 210, 220, the connection portion 240, the feeding portion 230, and a capacitor 250. The antenna unit according to this embodiment has the same components as the antenna unit shown in FIG. 2A, 3 or 4A, except for the capacitor 250. Thus, the same components will be provided with the same reference numerals, and their detailed explanations will be omitted.

The capacitor 250 is connected between a specific region of the second region 220b of the second metal member 220 and the printed circuit board (PCB) 181. The specific region is set to resonate at a high band (HB) region by the length of the first metal member 210, and by the length of the specific region of the second region 220b.

Since an impedance of the capacitor 250 is short-circuited at a low band (LB) having a high frequency band, a current is induced through the first region 220a of the second metal member 220. On the other hand, since the impedance of the capacitor 250 is increased at a high band (HB) having a low frequency band, a current is induced to the capacitor 250.

Accordingly, the antenna unit may be optimized even at a high band (HB) resonance.

Figure 5B:
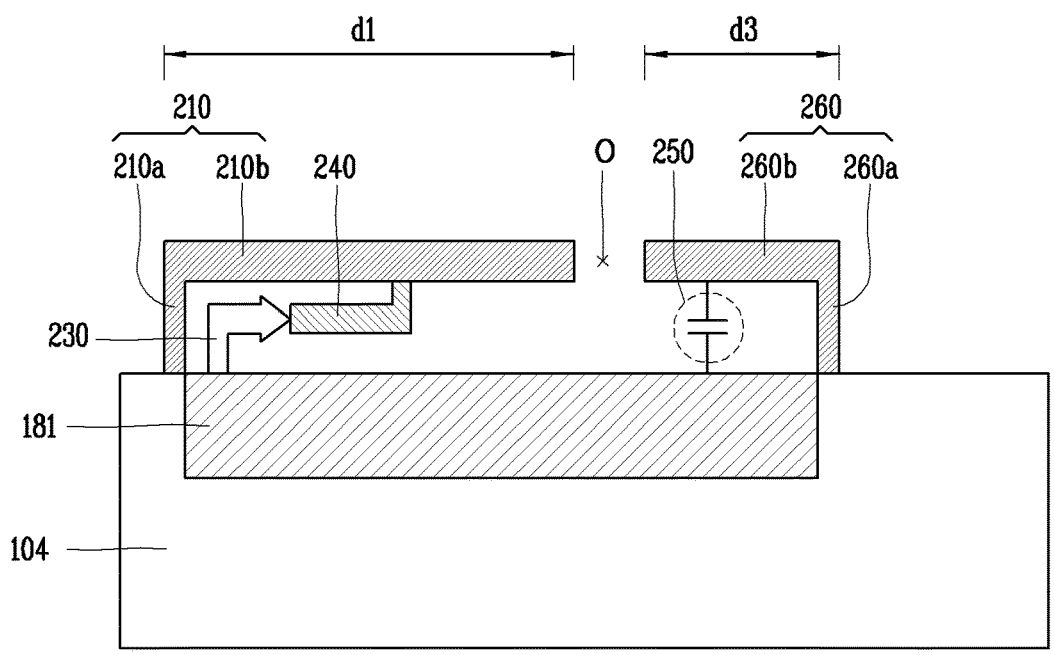

Referring to FIG. 5B, an antenna unit includes the first metal member 210 having the first and second regions 210a, 210b, and a second metal member 260. The antenna unit according to this embodiment has the same components as the antenna unit shown in FIG. 2A, 3 or 4A, except for the second metal member 260 and the capacitor 250. Thus, the same components will be provided with the same reference numerals, and their detailed explanations will be omitted.

The second metal member 260 having first and second regions 260a, 260b is formed to have a third length (d3), and the capacitor 250 is connected to the second region 260b. The capacitor 250 is formed at a region where an electromagnetic field by the first and second metal members 210, 260 is large. A resonance frequency of a low band (LB) may be controlled based on a position of the capacitor 250. The capacitor 250 corresponds to a low-value capacitor. The length of the second metal member 260 is shorter than that of the second metal member 220 of FIG. 2B to which the capacitor 250 is not connected.

Since the capacitor 250 is short-circuited at a low band (LB), a current is transferred to the metal frame 104 through the first region 260a of the second metal member 260.

The length of the second metal member 260, optimized at a high band (HB), may be implemented by the capacitor 250. This may enhance radiation efficiency of a high band (HB).

Figure 5C:
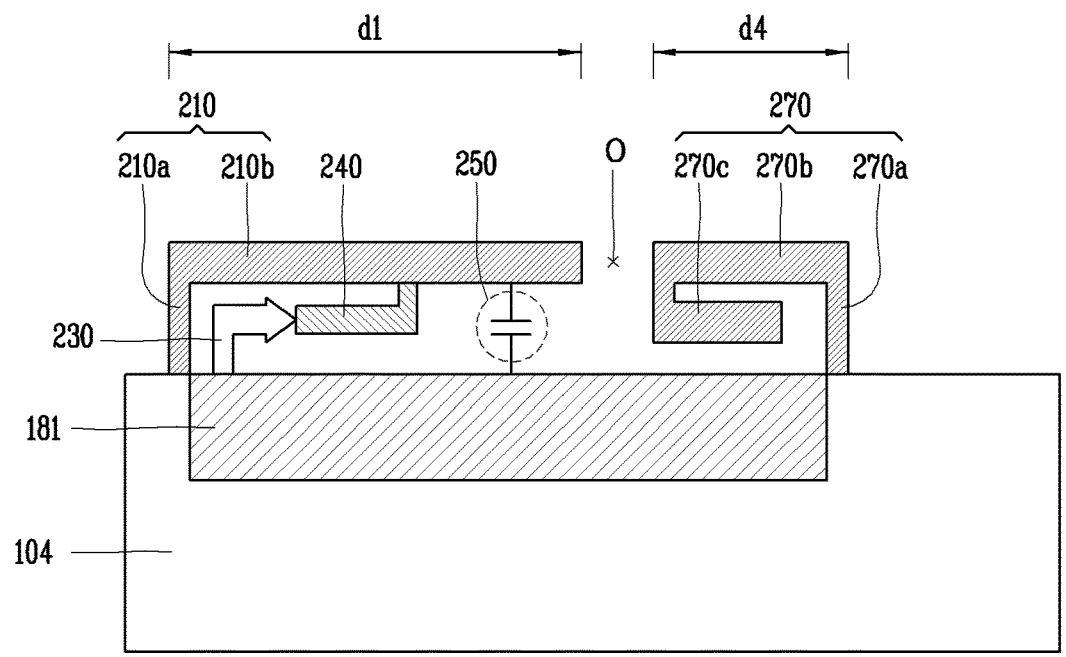

Referring to FIG. 5C, an antenna unit includes a first metal member 210 having first and second regions 210a, 210b, a second metal member 270 having first to third regions 270a, 270b, 270c, a capacitor 250 connected to the first metal member 210, a connection portion 240, and a feeding portion 230. The antenna unit according to this embodiment has the same components as the antenna unit shown in FIG. 2A, 3 or 4A, except for the second metal member 270 and the capacitor 250. Thus, the same components will be provided with the same reference numerals, and their detailed explanations will be omitted.

The second metal member 270 includes a first region 270a extended from the metal frame 104, a second region 270b extended from the first region 270a, and a third region 270c bent from the second region 270b and arranged between the second region 270b and the metal frame 104. An entire width of the second metal member 270 is a third length (d3), which is relatively smaller than the second length (d2) of the second metal member 220 shown in FIG. 2A. However, an entire length from the first region 270a to the third region 270c may be formed to be equal to the length of the second metal member 220 shown in FIG. 2.

That is, the second metal member 270 forms a specific pattern. Accordingly, a ground booster may be implemented with minimizing a space occupied by the second metal member 270.

The capacitor 250 is connected to the second region 210b of the first metal member 210. The capacitor 250 may connect the first metal member 210 to the PCB 181, and may control antenna efficiency by a capacity of the capacitor 250.

Figure 5D:
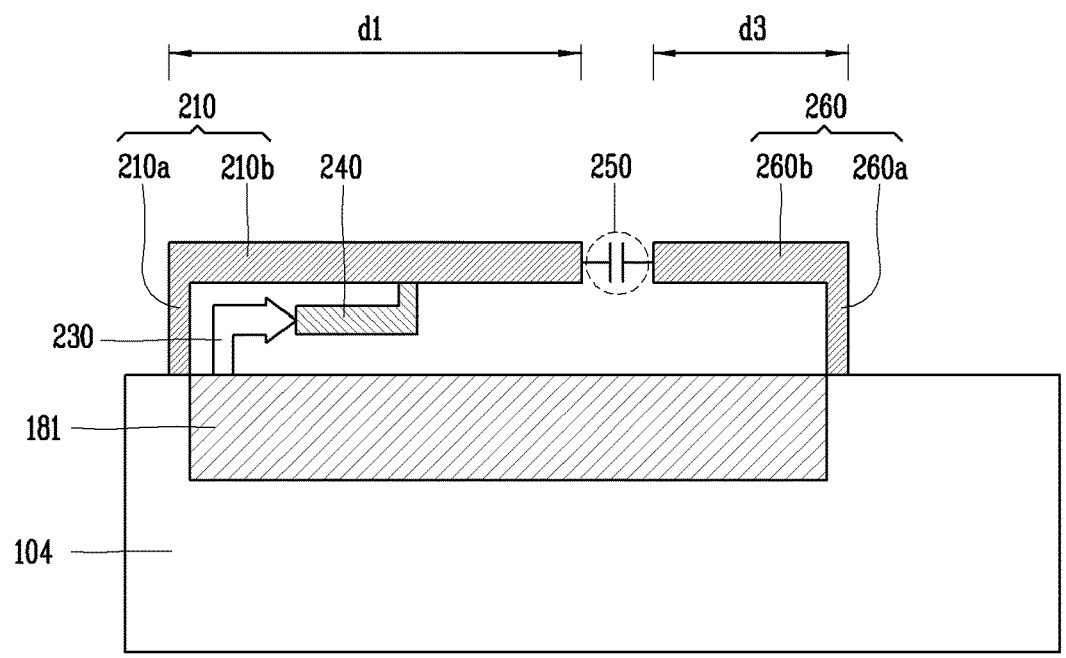

In an embodiment according to FIG. 5D, an antenna unit includes first and second metal members 210, 260 and a capacitor 250. The antenna unit according to this embodiment has the same components as the antenna unit shown in FIG. 5B, except for a position of the capacitor 250. Thus, the same components will be provided with the same reference numerals, and their detailed explanations will be omitted.

The capacitor 250 is formed to connect the first and second metal members 210, 260 to each other. That is, the capacitor 250 is formed to connect the second region 210b of the first metal member 210 to the second region 260b of the second metal member 260.

A coupling amount between the first and second members 210, 260 may be controlled based on an impedance value of the capacitor 250. Further, the length of the second metal member 260 may be controlled by the capacitor 250. That is, the length of the second metal member 260 is formed to be shorter than that of the first metal member 210.

By reducing the length of the second metal member 260, a space occupied by the antenna unit may be minimized.

Figure 6A:
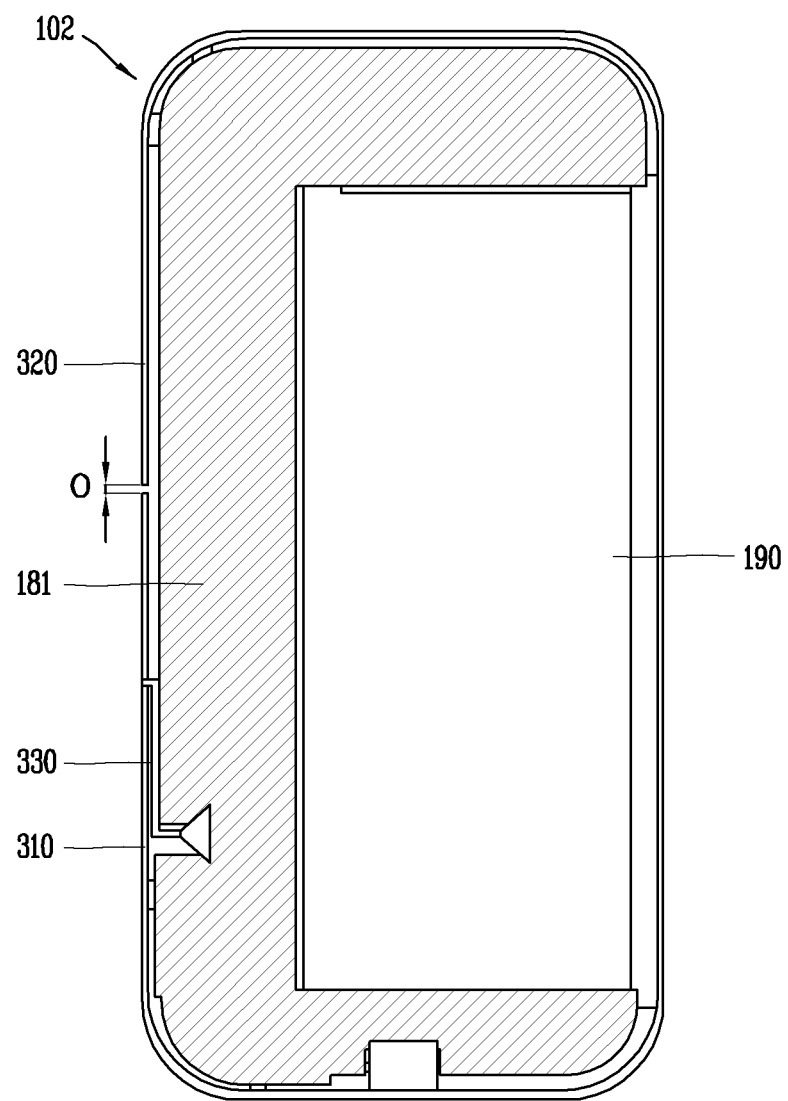
FIGS. 6A and 6B are conceptual views for explaining an antenna unit using a metal case of an electronic device.
Figure 6B:
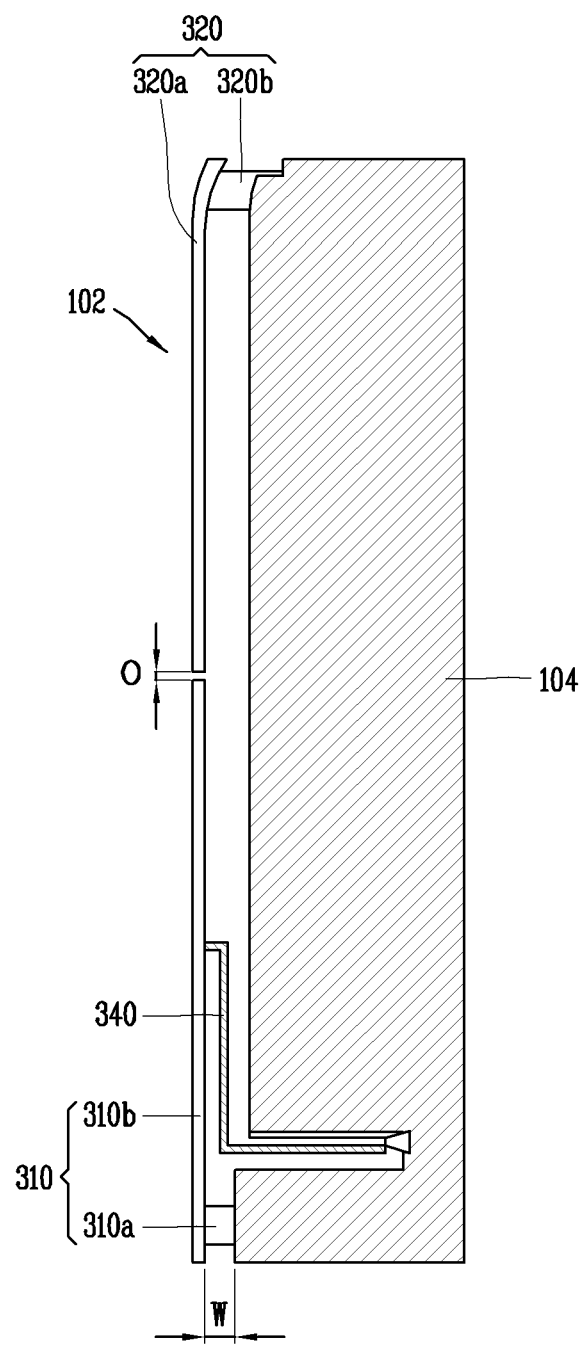

FIGS. 6A and 6B are conceptual views for explaining an antenna unit using the metal case of the electronic device.

Referring to FIG. 6A, an antenna unit according to this embodiment includes first and second metal members 310, 320 formed at one region of the metal case 102 which forms the appearance of the electronic device 100.

Each of the first and second metal members 310, 320 is connected to a ground layer of the PCB 181. The PCB 181 is arranged at an internal space of the electronic device 100 where the battery 190 is not provided. Thus, the antenna unit is implemented by a region of the metal case 102 adjacent to the PCB 181.

A gap (o) is formed between the first and second metal members 310, 320. That is, a slit is formed at one region of the metal case 102, and an insulating member may be formed at the slit.

A feeding portion extended from the PCB 181 is connected to the first metal member 310, thereby supplying a power.

That is, the first and second metal members 310, 320 of the antenna unit may be formed as a region of the metal frame. Alternatively, the first and second metal members 310, 320 of the antenna unit may be implemented by connecting a ground region of the PCB to the metal case which forms the appearance, without connecting an additional metal member to the metal frame.

Referring to FIG. 6B, an antenna unit according to this embodiment includes first and second metal members 310, 320 formed at one region of the metal case 102 which forms the appearance of the electronic device 100.

The first metal member 310 includes a second region 310b formed at one region of the metal case which forms the appearance of the electronic device, and a first region 310a for connecting the second region 310b to the metal frame 104. A feeding portion 330 connected to the PCB is electrically connected to the second region 310b of the first metal member 310.

The second metal member 320 includes a second region 320b formed at one region of the metal case 102 which forms the appearance of the electronic device, and a first region 320a for connecting the second region 320b to the metal frame 104.

The metal case 102 includes a slit having a specific interval so that a gap (o) is formed between the second regions 310b, 320b of the first and second metal members 310, 320. And a filling material of an insulating property may be applied to the slit. A separation distance (w) is formed between the metal frame 104 and the second regions 310b, 320b. For instance, the separation distance (w) may be within a range of 1 mm~2 mm.

In the embodiments, if the metal case which forms the appearance includes a slit and a specific separation space is formed from the metal frame (or the ground layer of the PCB) which forms a ground portion, the antenna unit may be implemented without an additional metal member.

FIGS. 7A to 7D are conceptual views for explaining first and second antenna units arranged on the side surfaces of the housing.

Figure 7A:
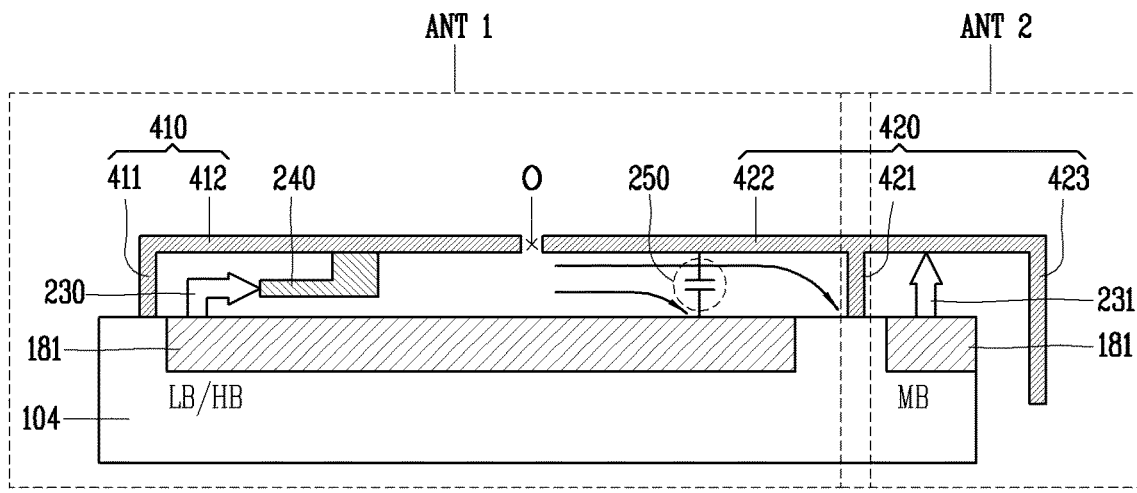
FIGS. 7A to 7D are conceptual views for explaining first and second antenna units arranged on the side surfaces of a housing.
Figure 7B:
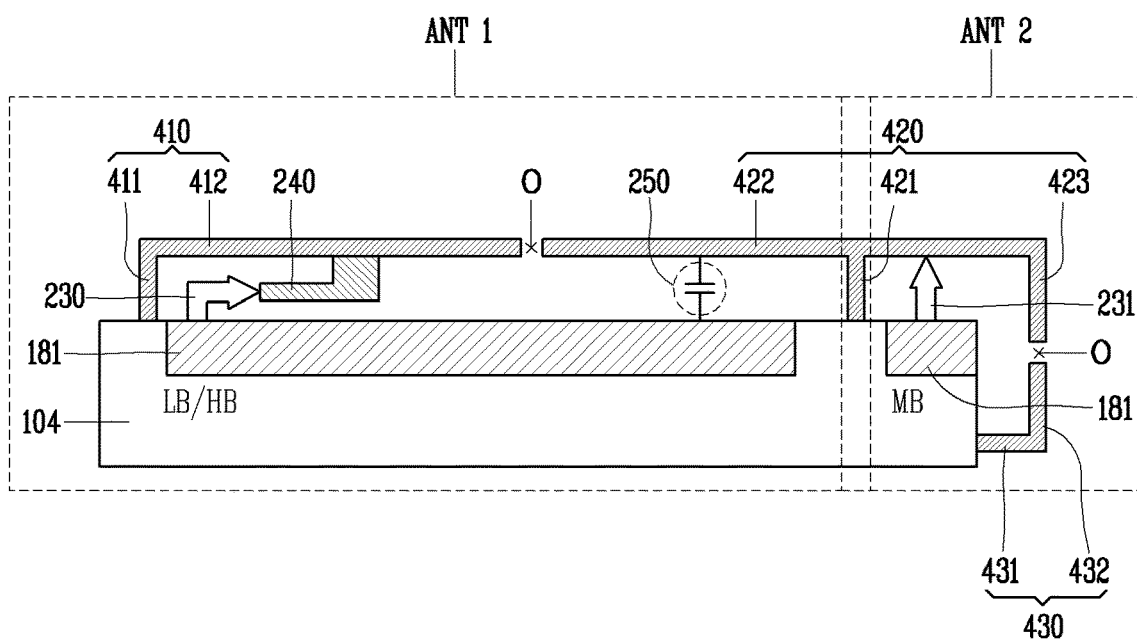

FIGS. 7A and 7B are views for explaining an example to arrange first and second antenna units so as to be adjacent to each other. Here, a low band (LB) antenna may be implemented as one of the embodiments of FIGS. 2A to 6B, and there is no limitation in combinations thereof.

Referring to FIG. 7A, formed are a first antenna unit (Ant1) having a low band (LB) resonance frequency and a high band (HB) resonance frequency, and a second antenna unit (Ant2) having a mid-band (MB) resonance frequency.

The first and second antenna units (Ant1, Ant2) include first and second metal members 410, 420, and first and second feeding portions 230, 231.

The first metal member 410 includes a first region 411 connected to the metal frame 104, and a second region 412 extended from the first region 411. The second metal member 420 includes a first region 421 connected to the metal frame 104, a second region 422 extended from the first region 421 toward one direction, and a third region 423 extended toward another direction.

The first antenna unit (Ant1) is implemented by the first and second regions 411, 412 of the first metal member 410, and the first and second regions 421, 422 of the second metal member 420. The first feeding portion 230 is electrically connected to the first antenna unit (Ant1) by the connection portion 240 connected to the first metal member 410.

A gap (o) is formed between the second region 412 of the first metal member 410 and the second region 422 of the second metal member 420. The first antenna unit (Ant1) further includes a low-value capacitor 250 connected to one region of the second metal member 420, and may control the length of the second metal member 420 and may enhance high band (HB) radiation efficiency.

The second antenna unit (Ant2) is implemented by the third region 423 of the second metal member 420, and a second feeding portion 231 connected to the third region 423.

Referring to FIG. 7B, a first antenna unit (Ant1) having a low band (LB) resonance frequency and a high band (HB) resonance frequency, and a second antenna unit (Ant2) having a mid-band (MB) resonance frequency are formed at one side surface of the metal frame 104. The first and second antenna units (Ant1, Ant2) according to this embodiment have the same components as the antenna units (Ant1, Ant2) shown in FIG. 7A, except for a third metal member 430. Thus, the same components will be provided with the same reference numerals, and their detailed explanations will be omitted.

The third metal member 430 includes a first region 431 extended from the metal frame 104, and a second region 432 extended from the first region 431. The second region 432 of the third metal member 430 is formed near the third region 423 of the second metal member 420, with forming a specific gap (o) therebetween.

Accordingly, the second antenna unit (Ant2) includes the first and third regions 421, 423 of the second metal member 420 to which a power is supplied by the second feeding portion 231, and the third metal member 430 configured as a ground booster.

The third metal member 430 is extended from a different edge of the metal frame. And a distance between the second region 432 of the third metal member 430 and the metal frame 104 may be shorter than a distance between the second region 412 of the first metal member 410 and the metal frame 104.

Figure 7C:
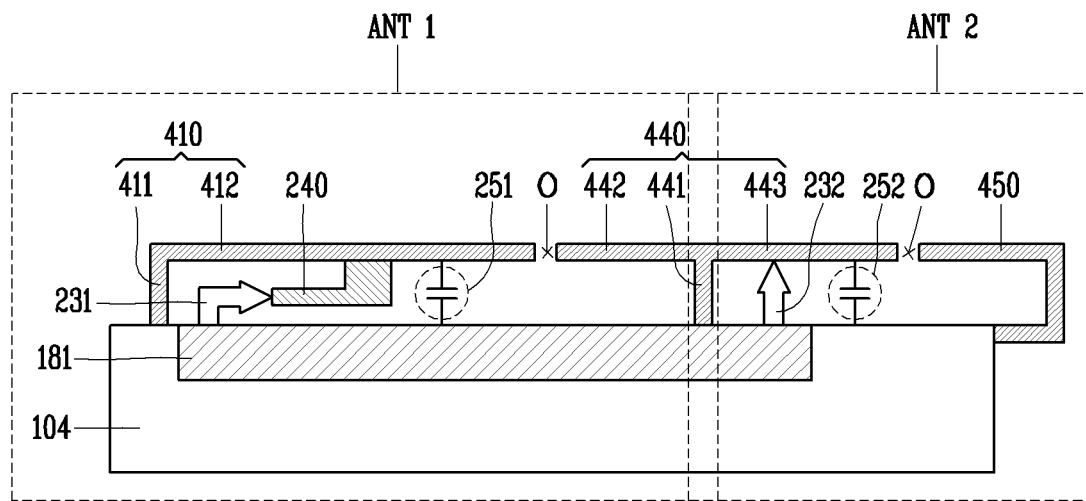

First and second antenna units (Ant1, Ant2) of FIG. 7C include first, fourth and fifth metal members 410, 440, 450, first and second feeding portions 230, 231, and first and second capacitors 251, 252.

The first metal member 410 includes a first region 411 connected to the metal frame 104, and a second region 412 extended from the first region 411. The fourth metal member 440 includes a first region 441 connected to the metal frame 104, a second region 442 extended from the first region 441 toward one direction, and a third region 443 extended toward another direction. The fifth metal member 450 may be extended from a region of the metal frame 104, and may have a two-time bent shape. The first and fourth metal members 410, 440, and the fifth metal member 450 are extended from different edges of the metal frame 104.

The first antenna unit (Ant1) is implemented by the first and second regions 411, 412 of the first metal member 410, and the first and second regions 441, 442 of the fourth metal member 440. The first feeding portion 230 is electrically connected to the first antenna unit (Ant1) by the connection portion 240 connected to the first metal member 410.

A gap (o) is formed between the second region 412 of the first metal member 410 and the second region 442 of the fourth metal member 440. The first antenna unit (Ant1) further includes a first capacitor 251 connected to one region of the first metal member 410, thereby reducing the length of the metal members of the first antenna unit (Ant1).

The second antenna unit (Ant2) includes the third region 443 of the fourth metal member 440, and the fifth metal member 450 which forms a gap (o) with the third region 443.

The second feeding portion 232 supplies a power to the third region 443 of the fourth metal member 440, and the second capacitor 252 is connected to the third region 443 of the fourth metal member 440.

That is, since the first and second antenna units (Ant1, Ant2) include metal patterns configured as a ground booster and capacitors, a space occupied by the antenna units may be minimized.

Figure 7D:
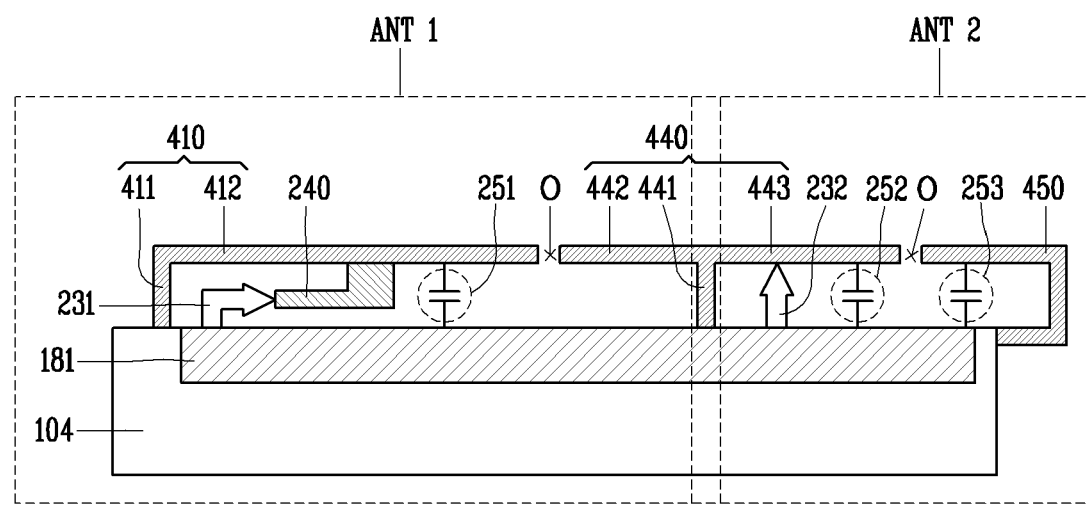

The antenna units (Ant1, Ant2) of FIG. 7D have the same components as the antenna units (Ant1, Ant2) of FIG. 7C, except for a third capacitor 253. Thus, the same components will be provided with the same reference numerals, and their detailed explanations will be omitted.

The third capacitor 253 is connected to the fifth metal member 450. By a value of the third capacitor 253, resonance of the second antenna unit (Ant2) may be controlled.

Figure 8A:
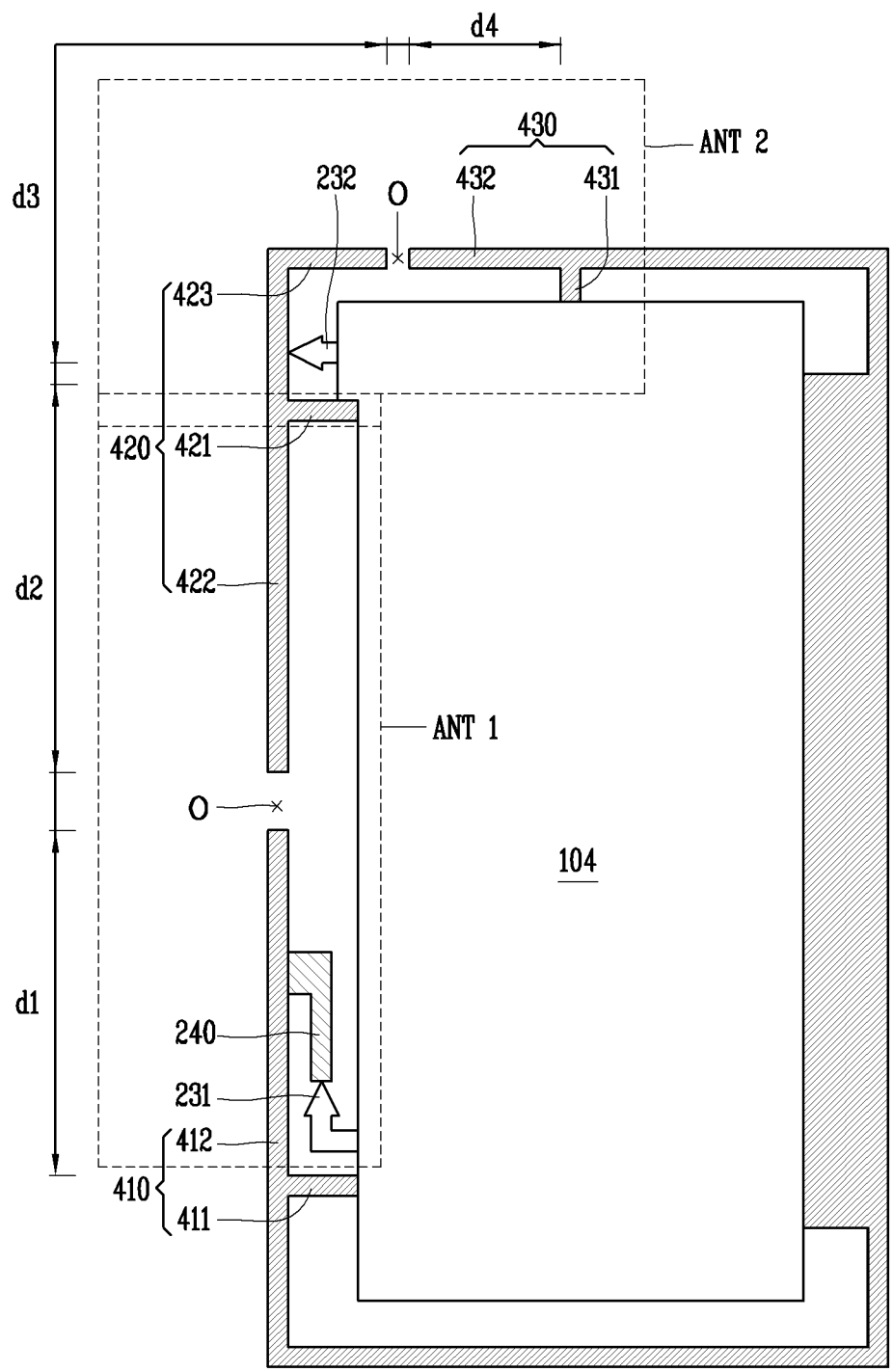
FIGS. 8A and 8B are conceptual views for explaining an arrangement structure of first and second antennas having different components.
Figure 8B:
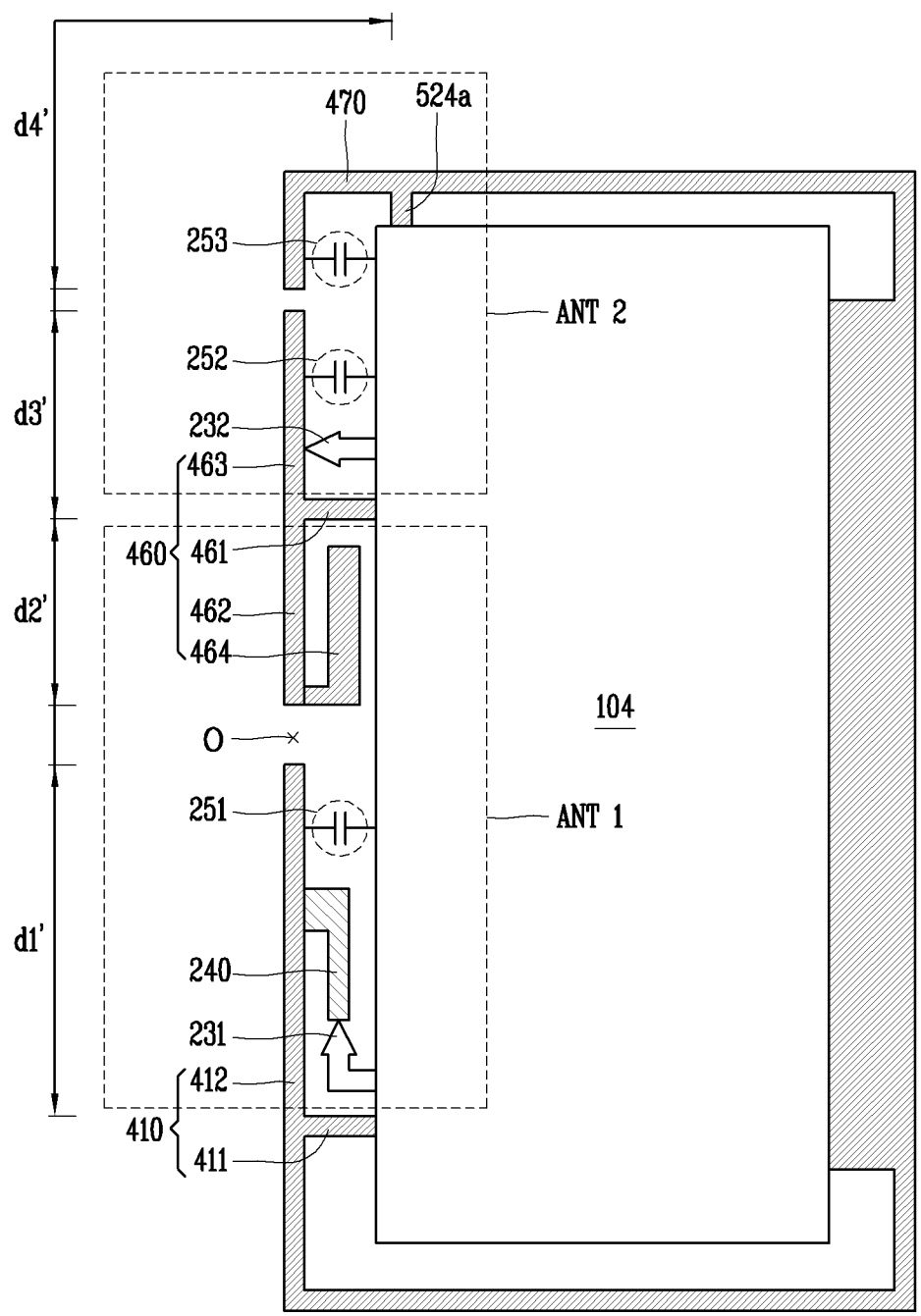

FIGS. 8A and 8B are conceptual views for explaining an arrangement structure of first and second antennas having different components.

Referring to FIG. 8A, the electronic device 100 according to this embodiment includes first to third metal members 410, 420, 430 which constitute first and second antennas (Ant1, Ant2).

The first metal member 410 includes a first region 411 connected to the metal frame 104, and a second region 412 extended from the first region 411. The second metal member 420 includes a first region 421 extended from the metal frame 104, and second and third regions 422, 423 extended from the first region 421 toward different directions. The third metal member 430 includes a first region 431 extended from the metal frame 104, and a second region 432 extended from the first region 431.

The first antenna (Ant1) is implemented by the first metal member 410, and the first and second regions 421, 422 of the second metal member 420. A connection portion 240 extended from the first metal portion 410 is connected to a first feeding portion 231, thereby supplying a power. A gap (o) is formed between the second region 412 of the first metal member 410 and the second region 422 of the second metal member 420.

The first and second regions 421, 422 of the second metal member 420 are configured as a ground booster for expanding a ground region of the first antenna (Ant1). If the first metal member 410 radiates after being provided with a power, the first and second metal members 410, 420 are coupled to each other. As a result, a current induced to the second metal member 420 is moved to the metal frame 104.

As the ground region is expanded, radiation efficiency may be enhanced.

The second antenna (Ant2) is implemented by the first and third regions 421, 423 of the second metal member 420, and the third metal member 430. A second feeding portion 232 supplies a power to the second metal member 420. The third region 423 of the second metal member 420 is arranged near the second region 432 of the third metal member 430, so as to form a gap (o) therebetween. The gaps (o) of the first and second antennas (Ant1, Ant2) may have different distances from each other.

The second and third metal members 420, 430 are coupled to each other, and an induced current is moved to the metal frame 104 through the third metal member 430. That is, the second antenna (Ant2) may also expand a ground region by using a ground booster formed of the third metal member 430.

The second region 412 of the first metal member 410, the second and third regions 422, 423 of the second metal member 420, and the second region 432 of the third metal member 430, which constitute the first and second antennas (Ant1, Ant2), have first to fourth lengths (d1, d2, d3, d4), respectively, as shown in the drawings.

Referring to FIG. 8A, a structure of the first and second antennas (Ant1, Ant2) having a plurality of capacitors will be explained.

The first and second antennas (Ant1, Ant2) according to this embodiment are implemented by first to third metal members 410, 460, 470, and include first to third capacitors 251, 252, 253.

The first metal member 410 includes a first region 411 connected to the metal frame 104, and a second region 412 extended from the first region 411. The second metal member 460 includes a first region 461 extended from the metal frame 104, second and third regions 462, 463 extended from the first region 461 toward different directions, and a fourth region 464 extended from the second region and formed between the second region 462 and the metal frame 104. The third metal member 470 is extended from the metal frame 104, and may have a shape bent along the edge of the metal frame 104.

The first antenna (Ant1) is supplied with a power from the first feeding portion 231, through the connection portion 240 connected to the first region 411 of the first metal member 410.

The end of the second region 412 of the first metal member 410 is arranged to form a gap (o) from the end of the second region 462 of the second metal member 460. The fourth region 464 of the second metal member 460 is bent from the end of the second region 462, thereby forming a specific pattern. The length of the second region 462 may be reduced by the fourth region 464.

The first antenna (Ant1) includes a first capacitor 251 connected to the second region 412 of the first metal member 410. By the first capacitor 251 which expands an electric wavelength, the length of the first metal member 410 may be reduced.

The second antenna (Ant2) is implemented by the first and third regions 421, 423 of the second metal member 420, and the third metal member 470.

The second feeding portion 232 connected to the second metal member 420 supplies a power. The third metal member 470 is arranged to form a gap (o) with the second region 422 of the second metal member 420.

The second capacitor 252 is connected to the third region 423 of the second metal member 420, and the third capacitor 253 is connected to the third metal member 470. By the second and third capacitors 252, 253, a resonance frequency may be controlled, and the length of the metal members may be reduced.

As shown in FIG. 8B, the second region 412 of the first metal member 410, the second and third regions 462, 463 of the second metal member 460, and the third metal member 470 have first to fourth lengths (d1', d2', d3', d4'), respectively.

Referring to FIGS. 8A and 8B, the sum of the lengths of the metal members shown in FIG. 8B may be smaller than that of the lengths of the metal members shown in FIG. 8A. Accordingly, a space occupied by the antenna units arranged on the side surfaces of the housing may be reduced by using the capacitors and the metal patterns.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An electronic device, comprising:
a housing having a metal frame; and
a first antenna unit configured to transmit/receive signals at a specific frequency band, the first antenna unit being arranged on one side surface of the housing,
wherein the first antenna unit includes:
a first metal member connected to the metal frame, and having a preset length to radiate at the specific frequency band by receiving power from a feeding portion;
a second metal member arranged adjacent to the first metal member, and having one end contacting the metal frame; and
a gap of a preset distance disposed between the first metal member and the second metal member, the first and second metal members being spaced apart from each other by the gap,
wherein a current induced through the second metal member, due to coupling between the first metal member and the second metal member by the gap, is moved to the metal frame,
wherein the first and the second metal members are spaced apart from the metal frame, and
wherein the first and second metal members are configured to resonate at the specific frequency band.

2. The electronic device of claim 1, wherein a length of the first metal member is equal to a length of the second metal member, and
wherein the length of each of the first and second metal members corresponds to ¼λ of the specific frequency band, or a sum the length of the first metal member and the length of the second metal member corresponds to ½λ of the specific frequency band.

3. The electronic device of claim 1, wherein the first and second metal members are integrally formed with the metal frame.

4. The electronic device of claim 3, further comprising:
a connection portion for connecting the feeding portion to the first metal member.

5. The electronic device of claim 1, further comprising:
a case including a metal material and forming an appearance of the housing,
wherein the first and second metal members are formed at one region of the case.

6. The electronic device of claim 5, wherein the case further includes an insulating member filled in the gap between the first and second metal members.

7. The electronic device of claim 5, wherein a space having a specific distance is formed between the case and the metal frame.

8. The electronic device of claim 1, wherein the housing further includes a display unit arranged on a front surface and configured to output images, and
wherein the first antenna unit is arranged on a side surface of the display unit in a lengthwise direction of the electronic device.

9. The electronic device of claim 8, further comprising:
at least one second antenna unit arranged on a lower side surface or an upper side surface of the display unit,
wherein the second antenna unit is configured to radiate at a resonance frequency higher than the specific frequency band.

10. The electronic device of claim 1, wherein the first antenna unit further includes a capacitor connected to the second metal member.

11. The electronic device of claim 10, wherein the capacitor is configured to be short-circuited at the specific frequency band.

12. The electronic device of claim 10, wherein a length of the second metal member is shorter than a length of the first metal member.

13. The electronic device of claim 1, wherein the second metal member includes:
a first region connected to the metal frame;
a second region extended from the first region towards the first metal member; and
a third region bent from the second region, and arranged between the second region and the metal frame.

14. The electronic device of claim 13, wherein a length of the second region is shorter than a length of the first metal member.

15. The electronic device of claim 1, further comprising:
a capacitor connected between the first and second metal members,
wherein a length of the second metal member is shorter than a length of the first metal member.

16. The electronic device of claim 1, wherein the second metal member includes:
a first region extended from the metal frame, and
second and third regions extended from the first region toward different directions,
wherein a second antenna unit is arranged adjacent to the first antenna unit, and the second antenna unit is configured to radiate at a resonance frequency higher than the specific frequency band by being formed of the first and third regions of the second metal member, and
wherein the second antenna unit further includes a feeding portion for supplying a power to the third region of the second metal member.

17. The electronic device of claim 16, wherein the second antenna unit further includes a third metal member having one end connected to the metal frame, and
wherein the third metal member is spaced apart from the third region by another gap, to be coupled with the second metal member.

18. The electronic device of claim 16, wherein the first antenna unit includes a first capacitor connected to the first metal member, and
wherein the second antenna unit includes a second capacitor connected to the third region of the second metal member.

19. The electronic device of claim 17, wherein the second antenna unit further includes a third capacitor connected to the third metal member.

20. An electronic device, comprising:
a metal frame; and
a first antenna unit electrically connected to the metal frame, the first antenna unit including:
a first metal member electrically connected to a feeding portion for receiving power,
a second metal member disposed adjacent to the first metal member, the second metal member being electrically connected to the metal frame, and
a gap disposed between the first metal member and the second metal member, the first and second metal members being spaced apart from each other by the gap,
wherein the first and the second metal members are spaced apart from the metal frame, and
wherein the second metal member is configured to supply an induced current to the metal frame based on mutual coupling between the first and second metal members.

* * * * *